United States Patent
Li et al.

(10) Patent No.: US 11,673,841 B2
(45) Date of Patent: Jun. 13, 2023

(54) PREPARATION METHOD FOR ALUMINA/TITANIUM SILICON CARBIDE COMPOSITE MATERTAL

(71) Applicant: University of Jinan, Jinan (CN)

(72) Inventors: Qinggang Li, Jinan (CN); Jinkai Li, Jinan (CN); Zongming Liu, Jinan (CN); Zhenyu Zhang, Jinan (CN); Guopu Shi, Jinan (CN); Zhi Wang, Jinan (CN)

(73) Assignee: University of Jinan, Jinan (CN)

( * ) Notice: Subject to any disclaimer, the term of this patent is extended or adjusted under 35 U.S.C. 154(b) by 0 days.

(21) Appl. No.: 17/892,081

(22) Filed: Aug. 21, 2022

(65) Prior Publication Data

US 2023/0075594 A1 Mar. 9, 2023

(30) Foreign Application Priority Data

Aug. 26, 2021 (CN) .......................... 202110987687.2

(51) Int. Cl.
  *C04B 35/575* (2006.01)
  *C04B 35/117* (2006.01)
  (Continued)

(52) U.S. Cl.
  CPC .......... *C04B 35/575* (2013.01); *C04B 35/117* (2013.01); *C04B 35/6261* (2013.01);
  (Continued)

(58) Field of Classification Search
  CPC . C04B 35/575; C04B 35/117; C04B 35/6261; C04B 35/645; C04B 2235/3217;
  (Continued)

(56) References Cited

U.S. PATENT DOCUMENTS 6,461,989 B1 * 10/2002 El-Raghy ............ C04B 35/6365
501/87

FOREIGN PATENT DOCUMENTS

| CN | 113823781 A | * 12/2021 | ............ H01M 4/36 |
| CN | 113839016 A | * 12/2021 | ............ H01M 4/36 |

* cited by examiner

*Primary Examiner* — Noah S Wiese
(74) *Attorney, Agent, or Firm* — Bayramoglu Law Offices LLC

(57) ABSTRACT

An alumina/titanium silicon carbide composite material is prepared by making titanium aluminum carbide ($Ti_3AlC_2$) in uniform contact with silicon monoxide (SiO), and carrying out vacuum sintering. The composite material is obtained through mutual diffusion of aluminum and silicon and has high compactness and stable performance. In the composite material, the alumina is generated by means of a reaction between the titanium aluminum carbide and the silicon monoxide, and can be uniformly wrapped around surfaces of titanium silicon carbide crystals to form a relatively compact oxide film, such that substance exchange between a matrix and the outside is hindered, and overall antioxidation of the composite material is improved. Toughness of the composite material is enhanced by means of the titanium silicon carbide. The prepared composite material has relatively high purity, relatively low sintering temperature, and relatively high bending strength. The process is simple and convenient for industrial production.

3 Claims, 3 Drawing Sheets

(51) Int. Cl.
*C04B 35/626* (2006.01)
*C04B 35/645* (2006.01)

(52) U.S. Cl.
CPC .... *C04B 35/645* (2013.01); *C04B 2235/3217* (2013.01); *C04B 2235/3418* (2013.01); *C04B 2235/3826* (2013.01); *C04B 2235/3843* (2013.01); *C04B 2235/6562* (2013.01); *C04B 2235/6567* (2013.01); *C04B 2235/785* (2013.01); *C04B 2235/786* (2013.01)

(58) Field of Classification Search
CPC .... C04B 2235/3418; C04B 2235/3826; C04B 2235/3843; C04B 2235/6562; C04B 2235/6567; C04B 2235/785; C04B 2235/786
See application file for complete search history.

PREPARATION METHOD FOR ALUMINA/TITANIUM SILICON CARBIDE COMPOSITE MATERIAL

CROSS REFERENCE TO THE RELATED APPLICATIONS

This application is based upon and claims priority to Chinese Patent Application No. 202110987687.2, filed on Aug. 26, 2021, the entire content of which is incorporated herein by reference.

TECHNICAL FIELD

The present disclosure belong to the field of ceramic matrix composite material, and particularly relates to a preparation method for an alumina/titanium silicon carbide ($Al_2O_3$/$Ti_3SiC_2$) composite material with silicon monoxide/titanium aluminum carbide (SiO/$Ti_3AlC_2$) as a raw material.

BACKGROUND

Due to the advantages of high melting point, high strength, antioxidation and thermostability, alumina is a promising ceramic matrix material. However, low toughness of alumina ceramics limits their application in industrial fields. For MAX ceramics, MAX phase refers to a ternary transition metal carbide or nitride, and its chemical formula is "$M_{n+1}AX_n$", M representing a transition metal element, A representing a IIIA or IVA element, X representing C or N, and n=1-3. MAX phase has high toughness in ceramic materials, and MAX phase ceramics have a thermal expansion coefficient relatively close to that of alumina, such that MAX phase ceramics are suitable for being combined with alumina ceramics for use, which can complement each other's advantages, so as to obtain a novel structural material having better mechanical properties.

Research has been made on MAX phase ceramics, especially a combination of a titanium silicon carbide ceramic material and alumina. However, at present, the sintering temperature required for preparing compact ceramic composite material by directly using titanium silicon carbide powder and alumina powder is about 1450° C., which is relatively high; an interface between titanium silicon carbide and alumina has no obvious reaction; and titanium silicon carbide is likely to decompose to generate impurities such as titanium carbide.

SUMMARY

Aiming at the problems existing in synthesis of an alumina/titanium silicon carbide ceramic composite material at the present stage, the present disclosure provides a preparation method for an alumina/titanium silicon carbide ceramic composite material. The method is used for preparing a titanium silicon carbide/alumina composite material with titanium aluminum carbide/silicon monoxide as a raw material, and the composite material has relatively high bending strength.

In order to achieve the above objective, the present disclosure employs the following technical solution:

a preparation method for an alumina/titanium silicon carbide composite material. The composite material is prepared with titanium aluminum carbide $Ti_3AlC_2$ powder and silicon monoxide SiO powder as a raw material.

The above preparation method specifically includes the following steps:

(1) mixing the raw material, that is, the titanium aluminum carbide $Ti_3AlC_2$ powder and the silicon monoxide SiO powder uniformly to obtain a mixture; and (2) sintering the mixture under the conditions of heat preservation and pressurization, carrying out cooling along with a furnace after heat preservation and pressurization, and turning off a vacuum system after cooling to obtain a pancake-shaped alumina/titanium silicon carbide composite material.

Further, in the step (1), the titanium aluminum carbide has a grain size of 3 μm-15 μm the silicon monoxide has a grain size of 0.5 μm-5 μm and the purity is 99.9%.

Further, in the step (1), a mixing method is used for mixing the titanium aluminum carbide powder and the silicon monoxide powder by means of ball milling.

In the above mixing method, a molar ratio of titanium aluminum carbide to silicon monoxide is 1:0.5-1.5.

Further, in the step (2), sintering under the condition of heat preservation includes: carrying out heating to 1200° C. at a heating rate of 1° C.-10° C. first, then carrying out heating to 1250° C.-1350° C. at a heating rate of 5° C./min-20° C./min, and carrying out heat preservation for 1.5 h-3 h; and a sintering pressure is 25 MPa-35 MPa.

The present disclosure relates to a method for converting a MAX phase material (titanium aluminum carbide) having relatively low cost into another MAX phase material (titanium silicon carbide) by means of a chemical reaction, and simultaneously generating alumina.

Beneficial Effects of the Present Disclosure

1. The composite material prepared in the present disclosure has high compactness and stable performance. In the composite material, the alumina is generated by means of a reaction between the titanium aluminum carbide and the silicon monoxide, and may be uniformly wrapped around a surface of titanium silicon carbide crystals to form a relatively compact oxide film, such that substance exchange between a matrix and the outside is hindered, and overall antioxidation of the composite material is improved. Toughness of the composite material is enhanced by means of the titanium silicon carbide. The prepared composite material has relatively high purity, relatively low sintering temperature, and relatively high bending strength.

2. The present disclosure is simple in process, and is convenient for industrial production.

DETAILED DESCRIPTION OF THE EMBODIMENTS

Figure 1:
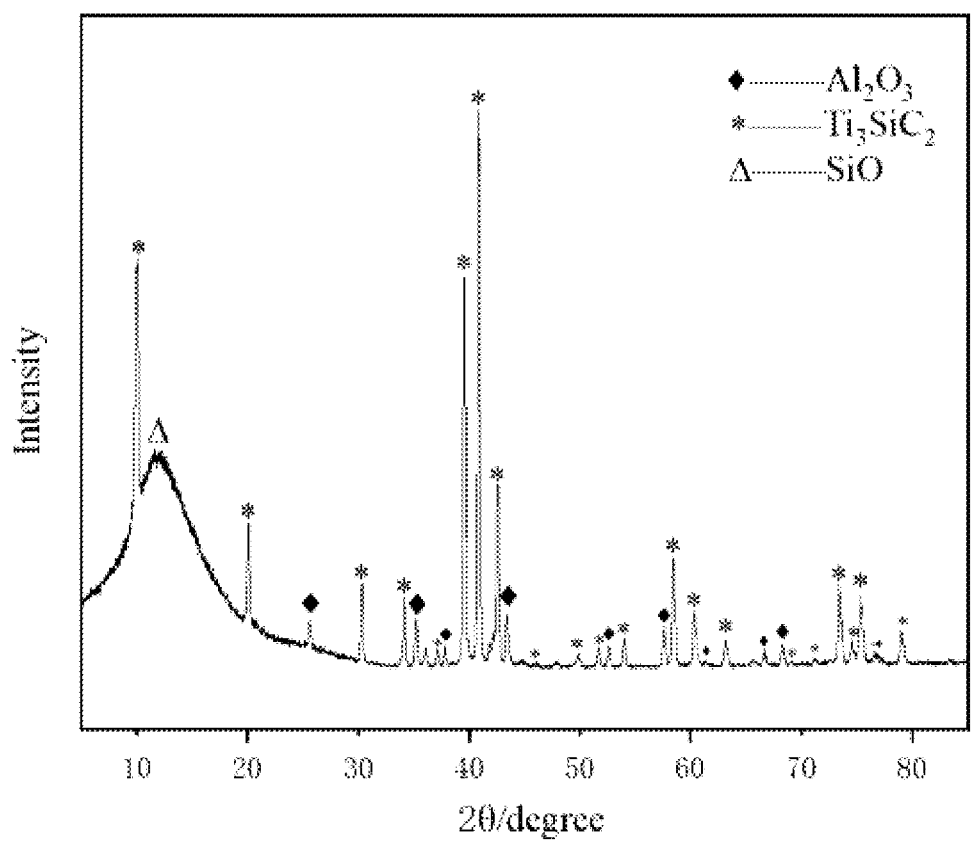
FIG. 1 is an X-ray diffraction pattern of a titanium silicon carbide/alumina composite material prepared by means of sintering through a mixing method in the present disclosure.

The present disclosure will be further illustrated below by means of examples, and it needs to be emphasized that the following description is only used for explaining the present disclosure, and is not intended to limit the contents thereof.

Embodiment 1

(1) 44.22 g of titanium aluminum carbide ($Ti_3AlC_2$) having a grain size of about 10 μm and 10.01 g of silicon monoxide (SiO) having a grain size of 1 μm-5 μm are added into a steel tank of a planetary ball mill to form totally about 54.23 g of mixture, a molar ratio of titanium aluminum carbide to silicon monoxide being about 1:1, the mixture is stirred with a glass rod so as to be more uniform, and then, 108.81 g of steel balls are put in, a mass ratio of the mixture to the balls being about 1:2.

(2) The steel tank of the planetary ball mill filled with the mixture in the step (1) is put into the planetary ball mill, a ball milling speed is set as 70 r/min, ball milling pauses for 10 min after being carried out 30 min each time, ball milling time is totally 2 h, and pause time is 30 min. After ball milling is finished, the mixture is taken out.

(3) The mixture obtained in the step (2) is loaded, in a structure of "lower pressure head-gasket-carbon paper-mixture-carbon paper-gasket-upper pressure head", into a hollow cylindrical graphite mold having a diameter of about 45 mm, the mold is put into a vacuum hot-pressing furnace, a vacuum system is turned on for vacuumizing, heating is carried out to 1200° C. at a heating rate of 10° C./min, then heating is carried to 1300° C. at a heating rate of 5° C./min, heat preservation is carried out at 1300° C. for 120 min, a sintering pressure is 30 Mpa, pressurization is started before heating is carried out to 1300° C., and a pressure is maintained for 120 min. After heat preservation and pressurization are finished, cooling is carried out along with a furnace, and when cooling is carried out to 200° C., the vacuum system is turned off to obtain a pancake-shaped alumina/titanium silicon carbide composite material.

(4) A surface of the pancake-shaped alumina/titanium silicon carbide composite material in the step (3) is polished by means of sand paper and a polishing machine to remove the carbon paper combined with the surface of the sample, so as to obtain a usable sample.

Embodiment 2

(1) 43.92 g of titanium aluminum carbide ($Ti_3AlC_2$) having a grain size of about 8 μm and 9.99 g of silicon monoxide (SiO) having a grain size of 1 μm-5 μm are added into a steel tank of a planetary ball mill to form totally about 53.91 g of mixture, a molar ratio of titanium aluminum carbide to silicon monoxide being about 1:1, and the mixture is stirred with a glass rod so as to be more uniform. Then, 107.54 g of steel balls are put in, a mass ratio of the mixture to the balls being about 1:2.

(2) The steel tank of the planetary ball mill filled with the mixture in the step (1) is put into the planetary ball mill, a ball milling speed is set as 70 r/min, ball milling pauses for 10 min after being carried out 30 min each time, ball milling time is totally 2 h, and pause time is 30 min. After ball milling is finished, the mixture is taken out.

(3) The mixture obtained in the step (2) is loaded, in a structure of "lower pressure head-gasket-carbon paper-mixture-carbon paper-gasket-upper pressure head", into a hollow cylindrical graphite mold having a diameter of about 45 mm, the mold is put into a vacuum hot-pressing furnace, a vacuum system is turned on for vacuumizing, heating is carried out to 1200° C. at a heating rate of 8° C./min, then heating is carried to 1340° C. at a heating rate of 5° C./min, heat preservation is carried out at 1340° C. for 120 min, a sintering pressure is 30 Mpa, pressurization is started before heating is carried out to 1340° C., and a pressure is maintained for 120 min. After heat preservation and pressurization are finished, cooling is carried out along with a furnace, and when cooling is carried out to 200° C., the vacuum system is turned off to obtain a pancake-shaped alumina/titanium silicon carbide composite material.

(4) A surface of the pancake-shaped alumina/titanium silicon carbide composite material in the step (3) is polished by means of sand paper and a polishing machine to remove the carbon paper combined with the surface of the sample, so as to obtain a usable sample.

Embodiment 3

(1) 44.13 g of titanium aluminum carbide ($Ti_3AlC_2$) having a grain size of about 10 μm and 10.82 g of silicon monoxide (SiO) having a grain size of 1 μm-5 μm are added into a steel tank of a planetary ball mill to form totally about 54.95 g of mixture, a molar ratio of titanium aluminum carbide to silicon monoxide being about 1:1, and the mixture is stirred with a glass rod so as to be more uniform. Then, 110.69 g of steel balls are put in, a mass ratio of the mixture to the balls being about 1:2.

(2) The steel tank of the planetary ball mill filled with the mixture in the step (1) is put into the planetary ball mill, a ball milling speed is set as 70 r/min, ball milling pauses for 10 min after being carried out 30 min each time, ball milling time is totally 2 h, and pause time is 30 min. After ball milling is finished, the mixture is taken out.

(3) The mixture obtained in the step (2) is loaded, in a structure of "lower pressure head-gasket-carbon paper-mixture-carbon paper-gasket-upper pressure head", into a hollow cylindrical graphite mold having a diameter of about 45 mm, the mold is put into a vacuum hot-pressing furnace, a vacuum system is turned on for vacuumizing, heating is carried out to 1200° C. at a heating rate of 12° C./min, then heating is carried to 1280° C. at a heating rate of 5° C./min, heat preservation is carried out at 1280° C. for 120 min, a sintering pressure is 35 Mpa, pressurization is started before heating is carried out to 1280° C., and a pressure is maintained for 120 min. After heat preservation and pressurization are finished, cooling is carried out along with a furnace, and when cooling is carried out to 200° C., the vacuum system is turned off to obtain a pancake-shaped alumina/titanium silicon carbide composite material.

(4) A surface of the pancake-shaped alumina/titanium silicon carbide composite material in the step (3) is polished by means of sand paper and a polishing machine to remove the carbon paper combined with the surface of the sample, so as to obtain a usable sample.

Embodiment 4

(1) 44.03 g of titanium aluminum carbide ($Ti_3AlC_2$) having a grain size of about 12 μm and 10.55 g of silicon monoxide (SiO) having a grain size of 0.5-3 μm are added into a steel tank of a planetary ball mill to form totally about 54.58 g of mixture, a molar ratio of titanium aluminum carbide to silicon monoxide being about 1:1, and the mixture is stirred with a glass rod so as to be more uniform. Then, 109.9 g of steel balls are put in, a mass ratio of the mixture to the balls being about 1:2.

(2) The steel tank of the planetary ball mill filled with the mixture in the step (1) is put into the planetary ball mill, a ball milling speed is set as 70 r/min, ball milling pauses for 10 min after being carried out 30 min each time, ball milling time is totally 2 h, and pause time is 30 min. After ball milling is finished, the mixture is taken out.

(3) The mixture obtained in the step (2) is loaded, in a structure of "lower pressure head-gasket-carbon paper-mixture-carbon paper-gasket-upper pressure head", into a hollow cylindrical graphite mold having a diameter of about 45 mm, the mold is put into a vacuum hot-pressing furnace, a vacuum system is turned on for vacuumizing, heating is carried out to 1200° C. at a heating rate of 1° C./min, then heating is carried to 1280° C. at a heating rate of 5° C./min, heat preservation is carried out at 1280° C. for 100 min, a sintering pressure is 30 Mpa, pressurization is started before heating is carried out to 1280° C., and a pressure is maintained for 100 min. After heat preservation and pressurization are finished, cooling is carried out along with a furnace, and when cooling is carried out to 200° C., the vacuum system is turned off to obtain a pancake-shaped alumina/titanium silicon carbide composite material.

(4) A surface of the pancake-shaped alumina/titanium silicon carbide composite material in the step (3) is polished by means of sand paper and a polishing machine to remove the carbon paper combined with the surface of the sample, so as to obtain a usable sample.

Effect Embodiments (1) The composite material prepared in embodiments 1-4 is subjected to a bending strength test, and specific test results are shown in Table 1.

The bending strength test is used for testing bending strength of a sample through a three-point bending method. Firstly, a sintered ceramic wafer is put on a grinding machine for coarse grinding, so as to remove graphite paper and impurities covering a surface of a sample, and the surface of the sample is roughly ground to be flat; then the roughly ground sample is polished; and finally the polished sample is cut into required sample strips by a wire cutting machine. Surfaces of the sample strips are smooth without visible defects, and each sample strip has a length of 36 mm, a width of 4 mm, and a height of 3 mm. An actual span in the sample test is 30 mm. The bending strength of the prepared sample is tested by an electronic universal material testing machine, and a pressing speed of an upper pressure head of the testing machine is 0.5 mm/min. A load P is recorded, and the bending strength is computed. Each sample is prepared into three sample strips to be tested three times, and finally a mean value is computed.

The bending strength is computed according to bending strength formulas of the following materials:

$$\sigma_f = \frac{3PL}{2bh^2}$$

$\sigma_f$—bending strength (Mpa);
P—fracture load (N);
L—fulcrum span (mm);
b, h—width and thickness of a sample (mm).

(2) An X-ray diffraction pattern of a titanium silicon carbide/alumina composite material prepared by mixing, by means of ball milling, and sintering titanium aluminum carbide/silicon monoxide prepared in the present disclosure is shown in FIG. 1, and a microscopic image and elemental analysis are shown in FIGS. 2 and 3A-3F.

FIG. 1 is an X-ray diffraction pattern of a titanium silicon carbide/alumina composite material prepared by mixing, by means of ball milling, and sintering titanium aluminum carbide/silicon monoxide. X-ray peaks reveal a $Ti_3SiC_2$ phase (*), a $Al_2O_3$ phase (♦) and an amorphous phase (Δ) in the composite material. The amorphous phase corresponds to a protrusion at a left side of FIG. 1. The $Ti_3SiC_2$ phase and the $Al_2O_3$ phase have clear XRD (X-ray diffraction) peaks.

Figure 2:
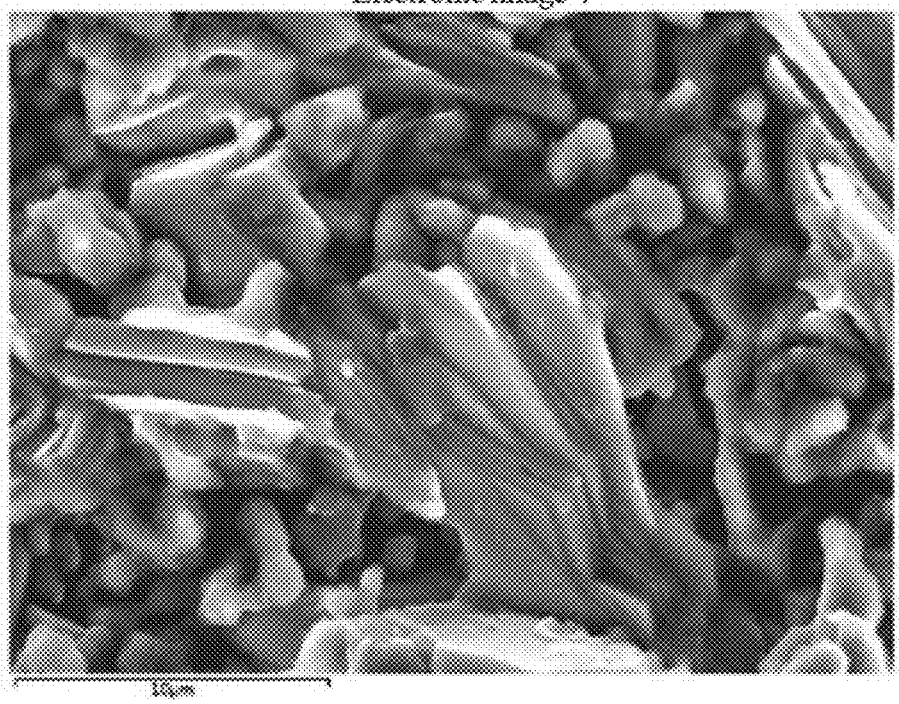
FIG. 2 is a microscopic image of a titanium silicon carbide/alumina composite material prepared by means of sintering through a mixing method in the present disclosure.
Figure 3A:
FIGS. 3A-3F are elemental analysis diagrams of a titanium silicon carbide/alumina composite material prepared by means of sintering through a mixing method in the present disclosure.
Figure 3B:
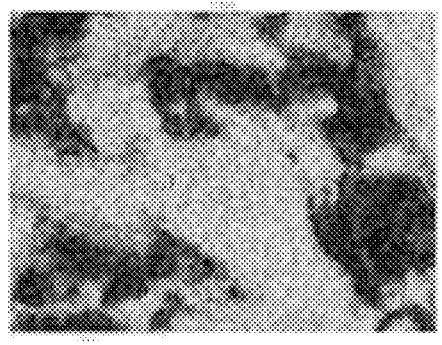
Figure 3C:
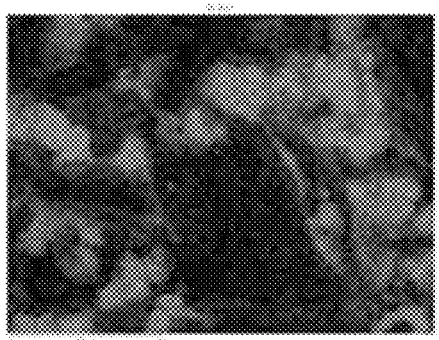
Figure 3D:
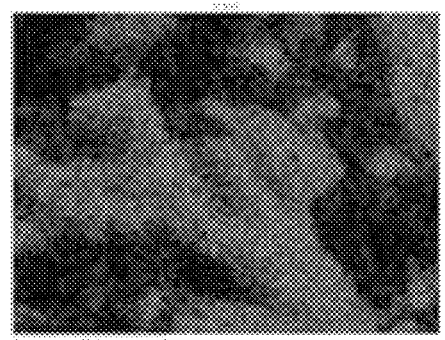
Figure 3E:
Figure 3F:
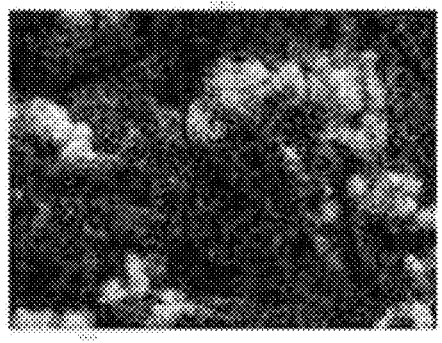

FIG. 2 is a microscopic image shown in a scanning electron microscope of a fracture surface generated in a bending strength test of a titanium silicon carbide/alumina composite material prepared by mixing, by means of ball milling, and sintering titanium aluminum carbide/silicon monoxide. An SEM (scanning electron microscope) micrograph of the fracture surface generated in a bending strength test contains layered crystal structures, each of the layered crystal structure having a length of about 10 μm, and crystal structures in other shapes around the layered crystal structures. The silicon monoxide phase may be removed during fracture test and ultrasonic treatment.

FIGS. 3A-3F are element distribution diagrams corresponding to FIG. 2. Distribution of Ti—Si—C is consistent with distribution of Al—O, and carbon from a decomposed $Ti_3$—$C_2$ layer is found. Thus, it is determined that in the SEM micrograph, a plurality of layers of $Ti_3SiC_2$ is tightly surrounded by $Al_2O_3$ (FIG. 2). There is no obvious Al signals in broken MAX grains, which implies that SiO may convert $Ti_3AlC_2$ having a grain size of 10 μm into layered $Ti_3SiC_2$.

What is claimed is:

1. A preparation method for an alumina/titanium silicon carbide ($Al_2O_3/Ti_3SiC_2$) composite material, wherein the alumina/titanium silicon carbide composite material is prepared with a titanium aluminum carbide $Ti_3AlC_2$ powder and a silicon monoxide SiO powder as a raw material; and wherein the method comprises the following steps:
(1) mixing the titanium aluminum carbide $Ti_3AlC_2$ powder and the silicon monoxide SiO powder uniformly to obtain a mixture, wherein
a molar ratio of titanium aluminum carbide to silicon monoxide is 1:0.5-1.5;
(2) loading the mixture into a vacuum system turned on for vacuumizing, sintering the mixture, carrying out a cooling in a furnace after sintering the mixture, and turning off the vacuum system after the cooling to obtain the alumina/titanium silicon carbide composite material,
wherein sintering the mixture comprises: carrying out a first heating to 1200° C. at a first heating rate of 1° C./min-10° C./min, carrying out a second heating to 1250° C.-1350° C. at a second heating rate of 5° C./min-20° C./min, for a time period of 1.5 h-3 h; and a sintering pressure of 25 MPa-35 MPa.

TABLE 1

| Bending Strength (Mpa) | Embodiment 1 | Embodiment 2 | Embodiment 3 | Embodiment 4 |
|---|---|---|---|---|
| Mean value | 349.5 | 347.9 | 371.6 | 386.3 |

2. The preparation method according to claim 1, wherein in the step (1), the titanium aluminum carbide has a grain size of 3 μm-15 μm, the silicon monoxide has a grain size of 0.5 μm-5 μm, and a purity is 99.9%.

3. The preparation method according to claim 1, wherein in the step (1), the mixture is mixed through a ball milling method.

* * * * *